United States Patent
Bonnet et al.

[11] Patent Number: 5,935,541
[45] Date of Patent: Aug. 10, 1999

[54] PROCESS FOR MANUFACTURE OF LITHIUM HEXAFLUOROPHOSPHATE

[75] Inventors: Philippe Bonnet, Lyons; Sylvain Perdrieux, Charly, both of France; Steven G. Schon, Strafford, Pa.

[73] Assignee: Elf Atochem, S.A., France

[21] Appl. No.: 09/089,188

[22] Filed: Jun. 3, 1998

[30] Foreign Application Priority Data

Jun. 6, 1997 [FR] France ................................ 97 07030
Jul. 4, 1997 [FR] France ................................ 97 08521

[51] Int. Cl.$^6$ .................................................. C01B 25/10
[52] U.S. Cl. ......................................................... 423/301
[58] Field of Search .............................................. 423/301

[56] References Cited

U.S. PATENT DOCUMENTS

| | | |
|---|---|---|
| 3,594,402 | 7/1971 | Wiesboeck . |
| 3,607,020 | 9/1971 | Smith . |
| 5,378,445 | 1/1995 | Salmon et al. ............... 423/301 |
| 5,601,797 | 2/1997 | Gentry ........................ 423/659 |

FOREIGN PATENT DOCUMENTS

| | | |
|---|---|---|
| 196 14 503 | 10/1996 | Germany . |
| 60-251109 | 12/1985 | Japan . |
| 64-72901 | 3/1989 | Japan . |
| 41 75216 | 6/1992 | Japan . |
| 52-79003 | 10/1993 | Japan . |
| 6-056413 | 3/1994 | Japan . |
| 2075435 | 3/1997 | Russian Federation . |

OTHER PUBLICATIONS

French Search Report dated Feb. 24, 1998.

*Primary Examiner*—Wayne Langel
*Attorney, Agent, or Firm*—Bell, Boyd, Lloyd

[57] ABSTRACT

The process of the present invention consists in bringing into contact, on the one hand, (A) gaseous phosphorus pentafluoride or a gaseous mixture comprising phosphorus pentafluoride and hydrochloric acid, and, on the other hand, (B) a solution of lithium fluoride in hydrofluoric acid, in a column (10) having a sufficient number of transfer units to carry out the reaction of $PF_5$ with LiF under the chosen conditions of temperature, of pressure and of molar ratio of the two contrasting reactants and with complete or substantially complete absorption of the $PF_5$ in the column. This process makes it possible to solve the problems of blockage by preventing recrystallizations of salts; to discharge the heat given off by the reaction by the evaporation of a portion of the HF; and to separate the HCl which may be contained in the starting $PF_5$, without loss of $PF_5$, thus allowing subsequent recovery/value enhancement of this HCl. Moreover, this process is very simple, with a very small number of stages, which makes it possible to avoid any entry of air or moisture capable of contaminating the final $LiPF_6$.

18 Claims, 8 Drawing Sheets

PROCESS FOR MANUFACTURE OF LITHIUM HEXAFLUOROPHOSPHATE

FIELD OF THE INVENTION

The present invention relates to a process which makes it possible efficiently to manufacture lithium hexafluorophosphate ($LiPF_6$), a product which can be used as electrolyte in lithium batteries. Lithium perchlorate was widely used in the past for this application but this product has proved to be dangerous. Lithium hexfluorophosphate, which simultaneously exhibits excellent applicational and environmental properties, presents itself as an essential substitute in the manufacture of lithium batteries.

BACKGROUND OF THE INVENTION

A large number of patents and publications found in the literature, which relate generally to the manufacture of $LiPF_6$, are only concerned with the synthesis of phosphorus pentafluoride ($PF_5$), without in any way expanding upon the method used in order to react this product with lithium fluoride (LiF). Thus, Patent JP-41 75 216 essentially provides a method for the preparation of $PF_5$ without metals, without $SO_4^{2-}$ ions and without heavy products; Patent JP-52 79 003 is targeted at producing $PF_5$ which is free of the impurity $POF_3$; Patent JP-65 6 413 is targeted at producing $PF_5$ without $PF_3Cl_2$; German Patent Application DE-A-196 14 503 also provides a method for accessing a purer $PF_5$.

The other patents and publications, which expand in greater detail upon a process for the synthesis of $LiPF_6$ itself, generally provide methods which are complex, of little use industrially and liable to introduce impurities. Thus, for example, U.S. Pat. No. 3,594,402 provides a method for the preparation and/or purification of $LiPF_6$ which involves the intermediate stage of a complex between acetonitrile and $LiPF_6$; U.S. Pat. No. 3,607,020 provides for carrying out the reaction between solid LiF and gaseous $PF_5$ in an organic solvent in which LiF is insoluble, $PF_5$ is soluble and $LiPF_6$ is "reasonably" soluble; Japanese Patent JP-60 251 109 provides for directly reacting solid $PCl_5$ with a lithium salt in solution in HF; Japanese Patent JP-64 72 901 provides a method which makes it possible to render solid LiF porous and then to react it with gaseous $PF_5$.

All these methods are very complex to industrialize because they make use of processes with multiple stages and/or involving solid/gas or solid/liquid reactions and/or requiring the use of intermediate organic solvents.

The quality requirements demanded by the market for $LiPF_6$ mean that the process implemented must be as simple as possible, that is to say minimize the number of unit operations, and that it must avoid operations in which solids are directly handled and the production line is correspondingly opened: the particular aim of this is to avoid the entry, into the process, of air and moisture capable of generating hydrolysable oxygen-containing impurities incompatible with the purity specifications desired for the final $LiPF_6$.

In its research into a method which would make it possible to obtain $LiPF_6$ in a simple way, Applicant considered, for this synthesis, bringing gaseous $PF_5$ into contact, and causing it to react, with LiF predissolved in HF. However, this operation of bringing into contact poses several practical problems:

first of all, the simple sparging of $PF_5$ into an LiF+HF solution inevitably results in blockages, a phenomenon not mentioned in the literature: this is explained by the speed of the $LiPF_6$ formation reaction, on the one hand, and by the limited solubilities of LiF and of $LiPF_6$ in HF, on the other hand;

subsequently, the reaction is rapid and exothermic: it is thus advisable to take measures to control the rise in temperature of the mixture, in order to avoid either excessive evaporation of the HF, which would then immediately cause recrystallization of the lithium salts and consequent blockages, or overheating detrimental to the safety of the plant and to the stability of the $LiPF_6$ formed.

The most economical methods for accessing $PF_5$ naturally include those which start from the cheapest starting materials, which are $PCl_3$ or $PCl_5$. The $PF_5$ thus formed is then accompanied by HCl. Having studied the $HF/PF_5/HCl$ equilibria, Applicant has shown that it is impossible to separate HCl in any simple way from $PF_5$; it is therefore necessary, in the stage of synthesis of $LiPF_6$, to employ a method which is compatible with the presence of this HCl, in other words which can start from a crude $PF_5$ resulting from a reaction employing $PCl_3$ or $PCl_5$.

DESCRIPTION OF THE INVENTION

Applicant has now demonstrated that it is possible continuously and reliably to generate $LiPF_6$ by bringing into contact, in a column having a sufficient number of transfer units, on the one hand, $PF_5$ gas, alone or accompanied by HCl (crude $PF_5$ resulting from a reaction employing $PCl_3$ or $PCl_5$), and, on the other hand, a solution of LiF in HF.

This process introduces a simple solution to the combination of problems mentioned above. The difficulties posed by bringing $PF_5$ into contact with LiF are avoided, because the reaction configurations which can be provided on the basis of the process of the invention make it possible in particular to absorb the heat given off by the reaction, the evaporation of a portion of the HF serving to remove the heat given off by the reaction, and to avoid blockages created by undesirable recrystallization of salts.

The process according to the present invention is also simple, thus differing very markedly from all the complex methods provided until now employing either solid/gas or solid/liquid reactions or the use of intermediate organic solvents.

At the same time, the process according to the present invention makes it possible, in an entirely unexpected way, advantageously to use crude $PF_5$, accompanied by HCl, because it has been demonstrated that it is possible, which was not obvious a priori, to completely absorb the $PF_5$ without any loss in the flow of HCl escaping from the reaction system, this being achieved without any blockage and with a perfectly controlled temperature profile. This separation of HCl, contained in this case in the starting $PF_5$, without loss of $PF_5$, allows easy subsequent treatment for recovery/value enhancement of this HCl because, according to the present invention, the latter is virtually pure and completely free of $PF_5$.

Finally, by minimizing the number of process stages, no air or moisture capable of contaminating the final $LiPF_6$ is allowed in, and the product is thus obtained with a high purity.

The subject of the present invention is thus a process for the manufacture of lithium hexafluorophosphate by reaction of phosphorus pentafluoride with lithium fluoride, characterized in that, on the one hand, (A) gaseous phosphorus pentafluoride or a gaseous mixture comprising phosphorus pentafluoride and hydrochloric acid and, on the other hand, (B) a solution of lithium fluoride in hydrofluoric acid are brought into contact in a column having a sufficient number of transfer units to carry out the reaction of phosphorus pentafluoride with lithium fluoride under the chosen conditions of temperature, of pressure and of molar ratio of the two contrasting reactants and with complete or substantially complete absorption of the phosphorus pentafluoride in the column.

As will be apparent to a person skilled in the art, the number of transfer units required for carrying out the reaction of $PF_5$ with LiF is highly dependent on the temperature, itself dependent on the working pressure. This number is also dependent on the $PF_5$/LiF molar ratio. By way of example, when the temperature is less than 20° C., the number of transfer units is generally between 2 and 20 and preferably between 4 and 10.

The phosphorus pentafluoride lithium fluoride supplied molar ratio is generally between 0.6 and 1.2 and preferably between 1.05 and 1.15. It is preferable to employ a slight excess of $PF_5$ with respect to the stoichiometry of the reaction in order to minimize the presence of LiF in $LiPF_6$.

The content of lithium fluoride in its solution in the feed hydrofluoric acid (B) is generally chosen so that the concentration of hydrofluoric acid at any point in the column is above the solubility threshold of the lithium fluoride and lithium hexafluorophosphate salts, taking into account also the evaporation of a fraction of the hydrofluoric acid by the energy given off by the reaction. The content by weight of LiF is advantageously between 2 and 6% and preferably between 3 and 5%.

Moreover, the reaction according to the invention is generally carried out at a pressure generally of between atmospheric pressure and 3 MPa, and preferably between atmospheric pressure and 2 MPa, and at a temperature generally of between −20 and 70° C., preferably between −10 and 40° C. However, it would not be departing from the invention to carry out the reaction according to the invention at pressures below atmospheric pressure.

The reaction according to the invention can be carried out under adiabatic conditions, the column then being surmounted by a condenser intended to recondense and to return the portion of the hydrofluoric acid evaporated from the said column as a result of the exothermicity of the reaction between the phosphorus pentafluoride and the lithium fluoride.

The reaction according to the invention can also be carried out under isothermal conditions, the column being cooled in order to absorb the heat given off by the reaction.

In accordance with a first embodiment, the column is fed countercurrentwise, the gaseous stream (A), composed of or containing phosphorus pentafluoride, being introduced at the column foot and the solution of lithium fluoride in hydrofluoric acid (B) being introduced at the head, lithium hexafluorophosphate leaving the column at the foot in solution in hydrofluoric acid.

In accordance with a second embodiment, the column is fed cocurrentwise, the gaseous stream (A), composed of or containing phosphorus pentafluoride, and the solution of lithium fluoride in hydrofluoric acid (B), being introduced at the base of the column, which then functions as a plug flow reactor, the resulting liquid solution of lithium hexafluorophosphate in hydrofluoric acid being separated at the head of the column.

In accordance with a third embodiment, the column is fed cocurrentwise, the gaseous steam (A), composed of or containing phosphorus pentafluoride, and the solution of lithium fluoride in hydrofluoric acid (B), being introduced at the column head, the resulting liquid solution of lithium hexafluorophosphate in hydrofluoric acid being separated in a separating vessel mounted on the withdrawal line at the base of the said column.

According to one very advantageous possibility of the invention, the starting material is a gaseous mixture obtained as crude product in the manufacture of phosphorus pentafluoride from phosphorus trichloride or from phosphorus pentachloride and consequently containing hydrochloric acid, chlorine and hydrofluoric acid, the hydrochloric acid then escaping in the vented material, completely or substantially completely free of phosphorus pentafluoride.

In accordance with the present invention, in order to obtain the desired product in the pure state, the resulting solution of lithium hexafluorophosphate in hydrofluoric acid can be easily evaporated in order to crystallize the lithium hexafluorophosphate, and the suspension of crystals thus obtained can then be treated in order to completely purify the finished product.

The column used in the process of the invention can be, for example, an empty, packed or plate column.

The process of the invention is, moreover, advantageously carried out continuously.

BRIEF DESCRIPTION OF THE DRAWINGS

The invention will be described with reference to non-limiting illustrations.

A description will now be given in more detail of six possible reaction configurations for the implementation of the process according to the invention, without regarding this list as exhaustive, with reference to the respective FIGS. 1 to 6 which are the corresponding assembly plans.

Figure 1:
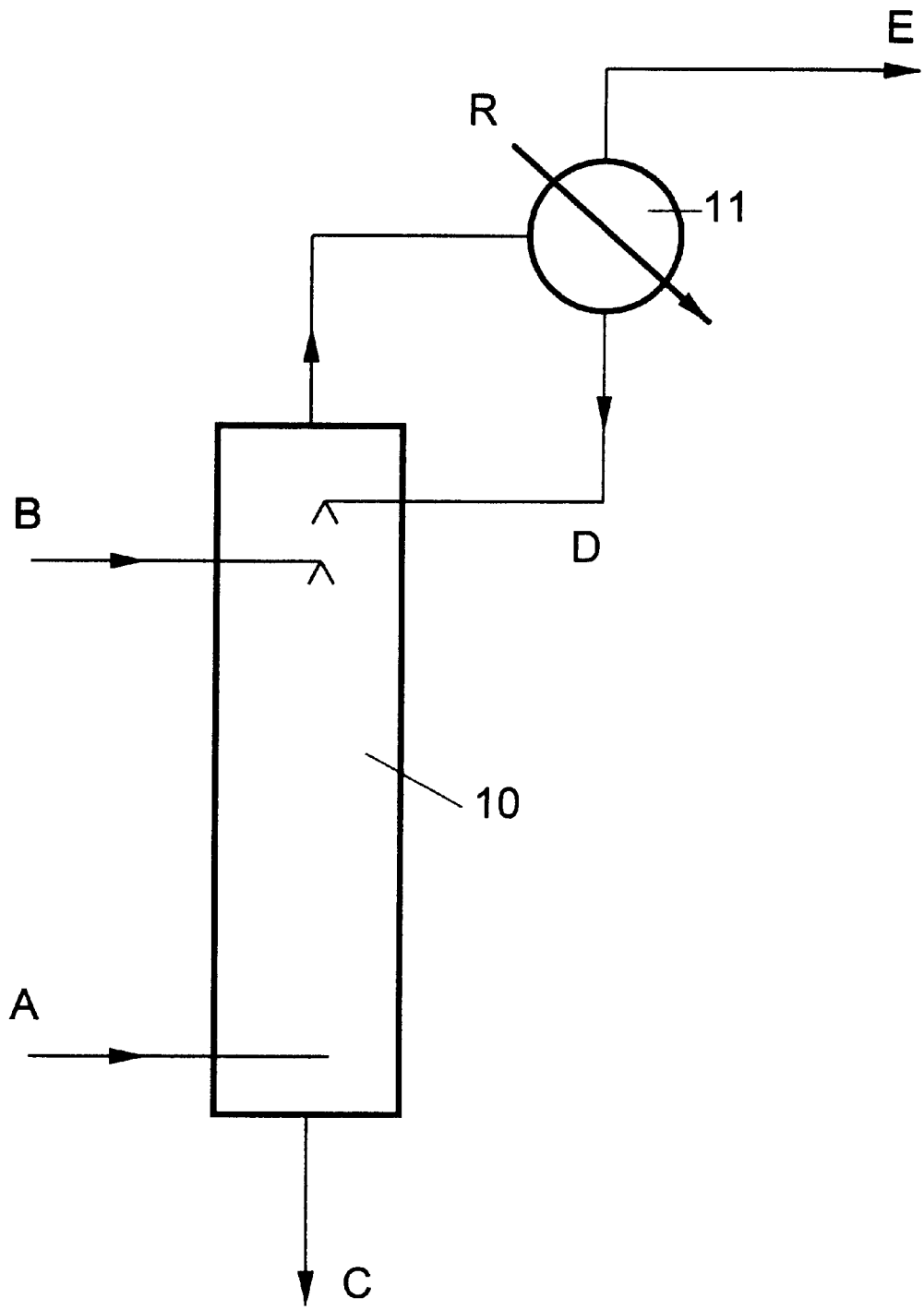
FIGS. 1–8 show schematic diagrams of reaction configurations.

A first reaction configuration, illustrated in FIG. 1, comprises a column 10 fed countercurrentwise: the gas (A), which is formed by $PF_5$, which may or may not be accompanied by HCl, is supplied at the foot whereas the LiF+HF solution (B) is supplied at the head. The $LiPF_6$ product leaves the column at the foot, in solution in HF (solution C).

In this adiabatic configuration, the column 10 is surmounted by a condenser 11 through which runs a coolant (R): this device is used to recondense and to return the portion of the HF evaporated from the column 10 as a result of the exothermicity of the reaction between LiF and $PF_5$ (flow D). In the case of the use of a pure $PF_5$, a small amount of HF escapes at the head of the condenser 13 (vented material E). In the case of the use of a crude $PF_5$ accompanied by HCl, the vented material (E) at the head of the condenser 13 is formed by HCl which carries away a small amount of HF but is generally virtually completely free of $PF_5$. This HCl can then be conveyed to a treatment unit known to a person skilled in the art, in order to be defluorinated and thus enhanced in value.

The reaction column 10 is an absorption column which can be of any type: empty, packed or plate. Its dimensions are chosen to enable a number of transfer units to be prepared which is sufficient for the absorption and the reaction of the $PF_5$ to take place under good conditions: this number can vary significantly depending on the temperature and concentration conditions.

The amount of HF introduced at the column head, and hence the concentration of LiF in the head feed, must be such that the concentration of HF at any point in the column is above the solubility threshold of the LiF and $LiPF_6$ salts, while taking into account the evaporation of a fraction of the HF by the energy given off by the reaction. This places the content of LiF in the HF supplied at the column head below 6% by weight and preferably between 3% and 5% by weight, depending on the ratio of $PF_5$ to LiF supplied.

It is generally preferable to operate with a slight excess of $PF_5$, so as to consume all the LiF and thus to obtain an $HF+LiPF_6$ solution which does not contain LiF; under these conditions, some traces of $PF_5$ will be found in the gas flow exiting from the column head.

The temperature profile depends essentially on the pressure at which the column is operated. However, it is desirable to limit the temperature to less than 70° C., without the maximum constituting a limit to the invention: the only concern here is to promote the reaction and not to redecompose the $LiPF_6$ which has formed.

The solution of $LiPF_6$ in HF obtained at the column foot then undergoes a treatment which consists in removing the HF by evaporation, in order to crystallize the $LiPF_6$, and in then treating the suspension of crystals thus obtained, in order to completely purify the finished product.

Figure 2:
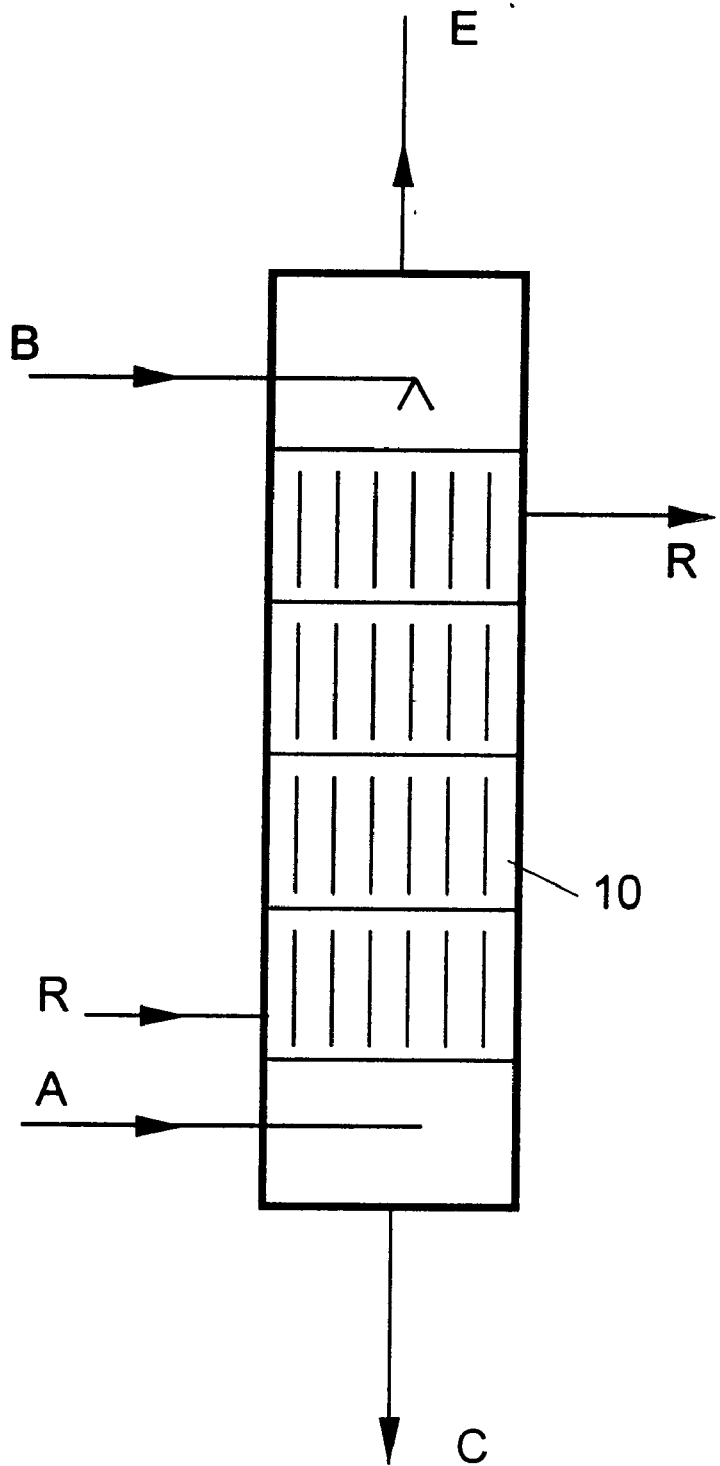

A second reaction configuration, illustrated in FIG. 2, corresponds to the isothermal alternative form of the above case: the column 10 is cooled by any means (jacket in which circulates a coolant (R), integral exchanger(s), and the like), in order to absorb the heat given off by the reaction. Apart from the fact that it is no longer necessary to have a head condenser, the recommendations made with respect to the first reaction configuration are all valid.

Figure 3:
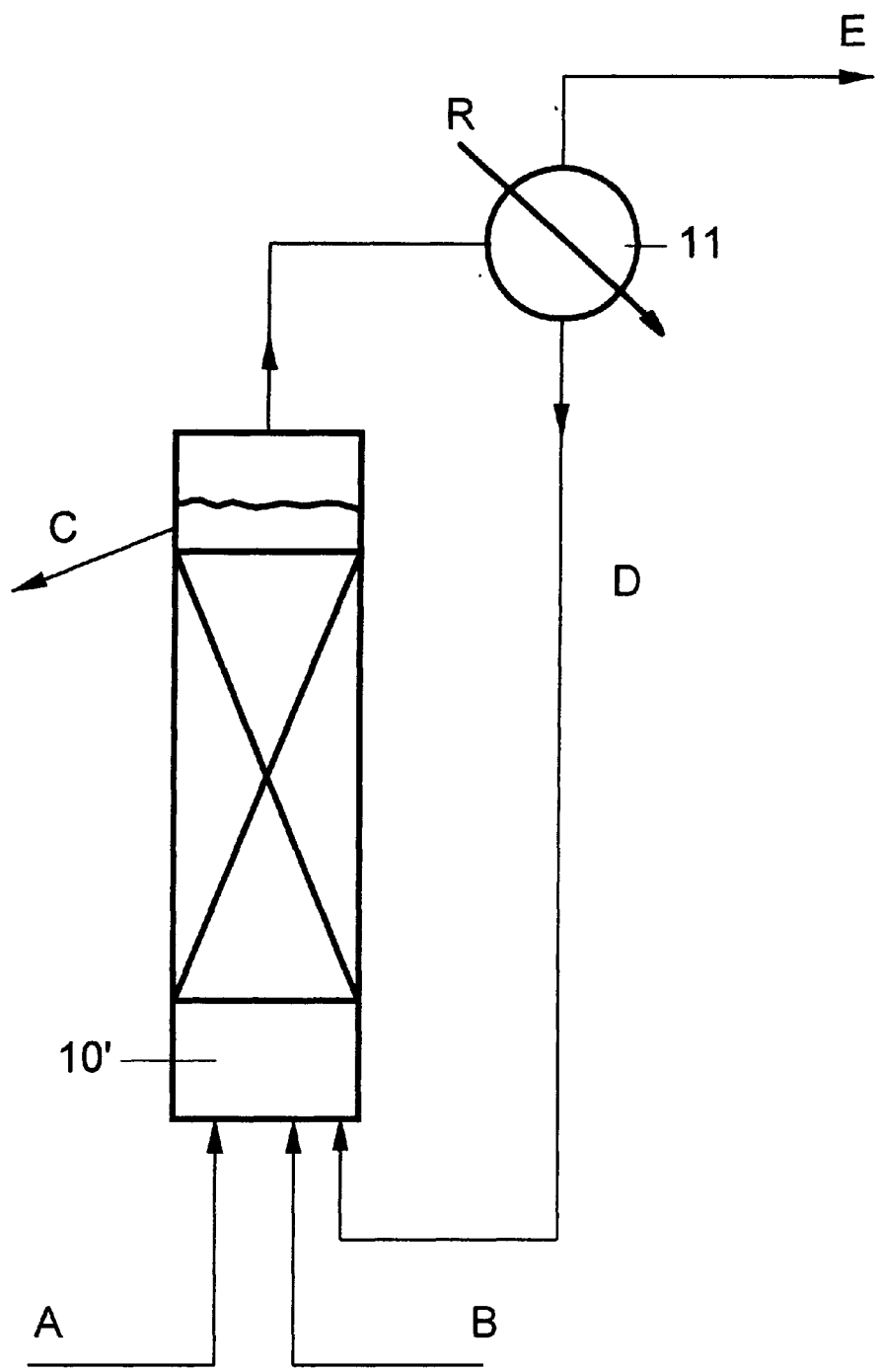

The third reaction configuration applies particularly well to the problem posed: it uses a cocurrentwise column 10', as illustrated in FIG. 3.

The two reaction feeds, namely (A) $PF_5$, which may or may not be accompanied by HCl, on the one hand, and (B) the solution of LiF in HF, on the other hand, are introduced at the base of the column 10'.

Under these conditions, the column 10', which can be empty but is preferably packed, is used as a plug flow reactor, along which the reaction progresses. At the head of the column 10', the liquid solution (C), composed of $LiPF_6$+HF, is separated from the gas phase, composed of the portion of HF evaporated by the exothermicity of the reaction, which may or may not be accompanied by HCl: a condenser 11 makes it possible to recondense the HF and to recycle it (flow D) to the base of the column 10', whereas any HCl which may be present escapes at the head, carrying away a small amount of HF (flow E) but generally virtually completely free of $PF_5$. This HCl can then be conveyed to a treatment unit known to a person skilled in the art, in order to be defluorinated and thus enhanced in value.

The advantage of this cocurrent configuration is, as was said above, the production of a reactor of plug flow type: it is known that this type of reactor is generally more efficient than the stirred reactor, in that it requires a shorter residence time to achieve a given degree of reaction conversion, on the one hand, and in that it is generally more selective, on the other hand. In the case in which the reaction concerned is exothermic and where only a small rise in temperature is acceptable, which is the case here, the plug flow reactor of tubular type is generally impracticable because it offers an excessively low exchange surface area for the requisite discharge of heat. The artfulness of the configuration provided here is that it allows discharge of heat by evaporation of a fraction of the HF while maintaining the plug flow character: the combination of the flows travelling from the bottom upwards (including the evaporated HF and the unreactive HCl), on the one hand, and the presence of appropriate packings, on the other hand, make it possible to maintain plug flow conditions despite the turbulence caused by the boiling of a portion of the HF and by the presence of a gaseous phase.

The packings used in this configuration will preferably be chosen from those which promote gas-liquid contacts and radial mixing while minimizing axial agitation: mention may be made, without this limiting the invention, of cross-shaped or helical-shaped static mixer components, for example.

As in the previous configurations, the height of the column must be sufficient to provide for correct absorption and correct reaction of the $PF_5$.

Likewise, the content of LiF in the solution introduced should be such that, at any point in the column 10', there is always enough HF to dissolve the lithium salts, while taking into account the evaporation of a fraction of the HF by the energy given off by the reaction.

It will generally be preferable to operate with a slight excess of $PF_5$ and thus to obtain, at the head, a solution of $LiPF_6$ in HF which does not contain LiF: under these conditions, some traces of $PF_5$ will be found in the gaseous flow exiting at the head of the column 10'.

As indicated earlier, the temperature profile depends essentially on the pressure at which the column is operated. However, it is desirable to limit the temperature to less than 70° C., without this maximum constituting a limit to the invention, with the aim of promoting the reaction and of not redecomposing the $LiPF_6$ which has formed.

The solution (C) of $LiPF_6$ in HF obtained at the head of the column 10' then undergoes a treatment which consists in removing the HF by evaporation, in order to crystallize the $LiPF_6$, and in then treating the suspension of crystals thus obtained, in order to completely purify the finished product.

Figure 4:
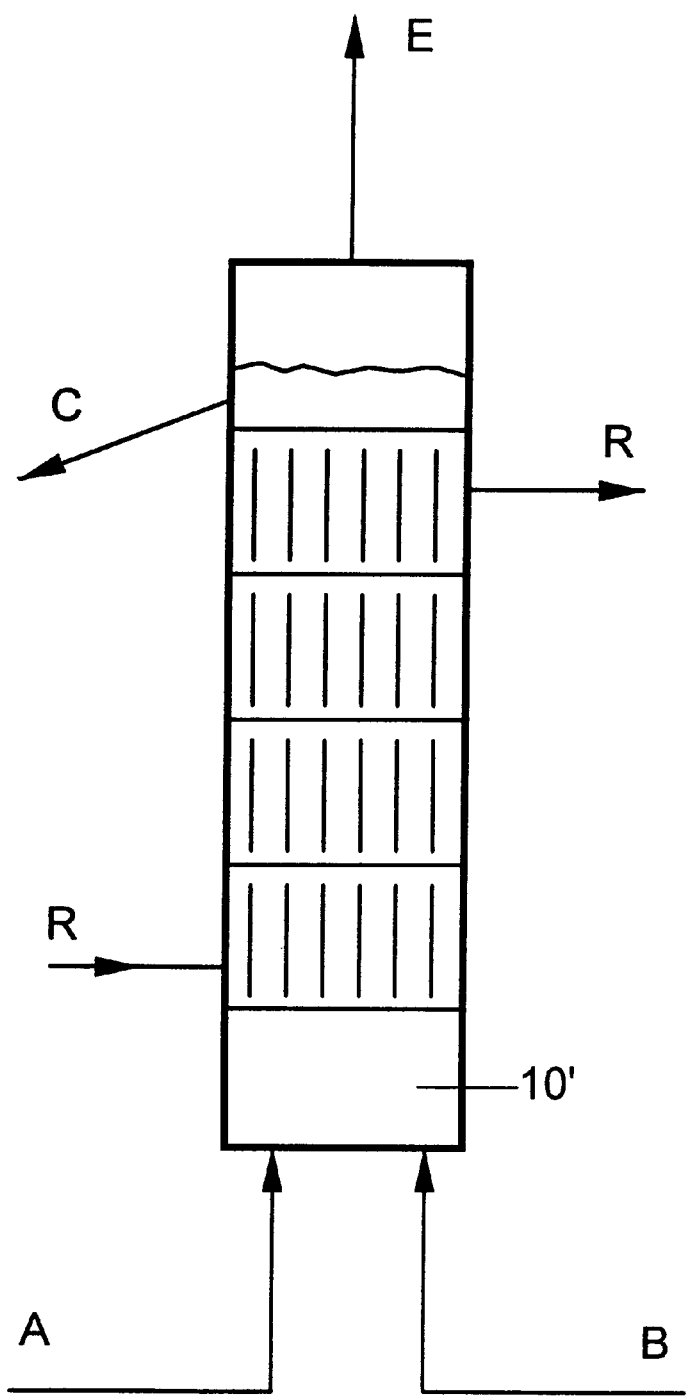

A fourth reaction configuration, illustrated in FIG. 4, corresponds to the isothermal alternative form of the preceding case: the column 10' is cooled by any means, in order to absorb the heat given out by the reaction, thus avoiding the installation of a head condenser. This configuration can depart from the plug flow reactor if internal exchangers are used, but it is still a cocurrent configuration which falls within the scope of the invention because it makes it possible to solve perfectly well all the problems posed.

Figure 5:
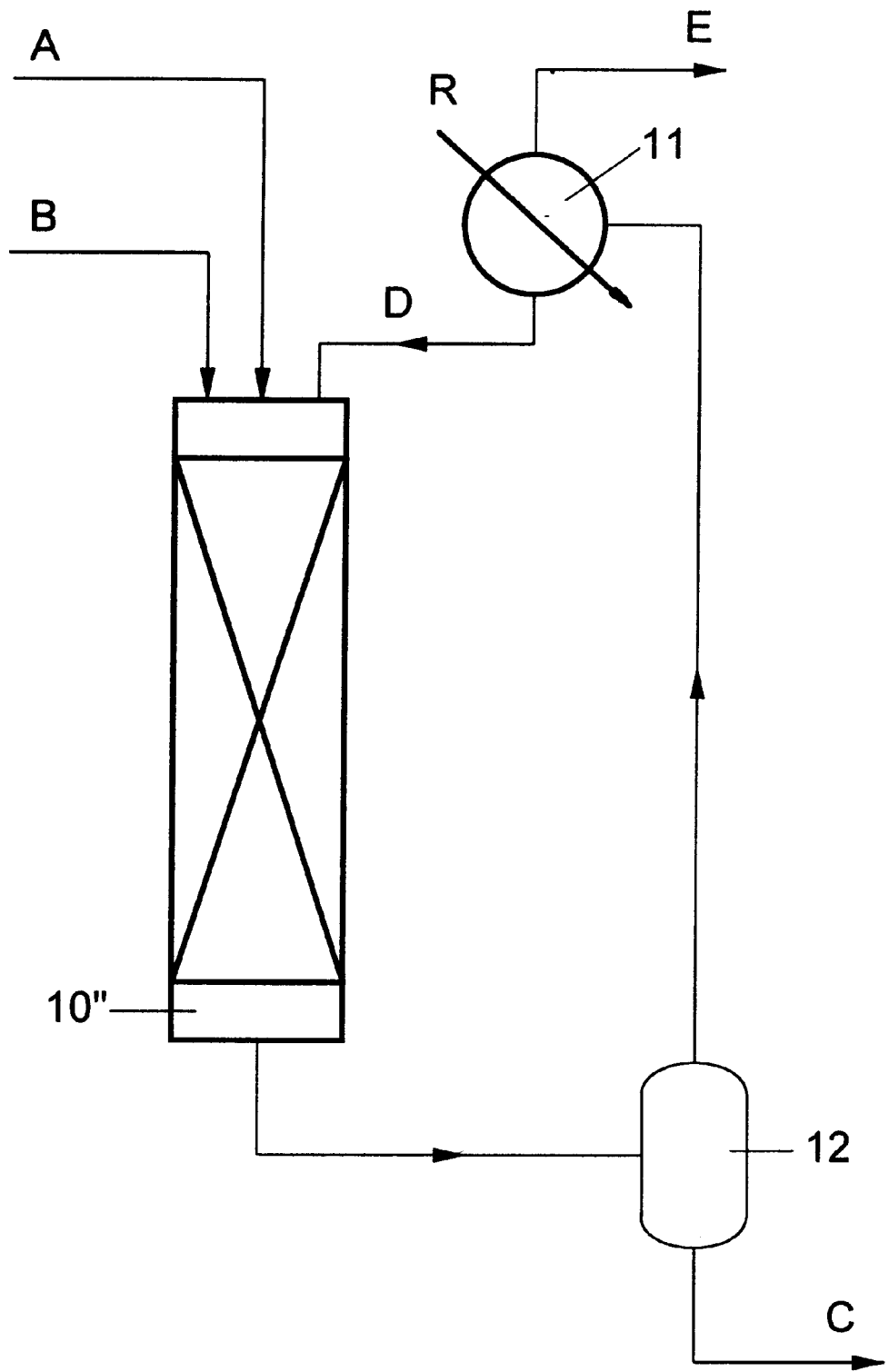

A fifth reaction configuration, illustrated in FIG. 5, corresponds to a column 10" which is also a cocurrent column, but this time the feedings (A) and (B) are carried out at the head.

This version is particularly effective if the system is arranged so that the descending liquid flow (B) carries the gas (A) downwards since in this way the reactor still retains its plug flow character while acquiring a very high degree of radial agitation, which is favourable to gas/liquid transfers and thus to the reaction for the manufacture of $LiPF_6$. At the base of the column 10", a separating vessel 12 makes it possible to separate the HCl+HF (+excess $PF_5$) gas phase from the desired liquid phase (C): $LiPF_6$ in HF. A condenser 11, through which passes a coolant (R), receives this gas phase in order to return the HF (flow D) to the head of the column 10", the vented material (E) being formed as above.

As regards the operating conditions, the same recommendations as those mentioned for the preceding reaction configurations also apply here.

Figure 6:
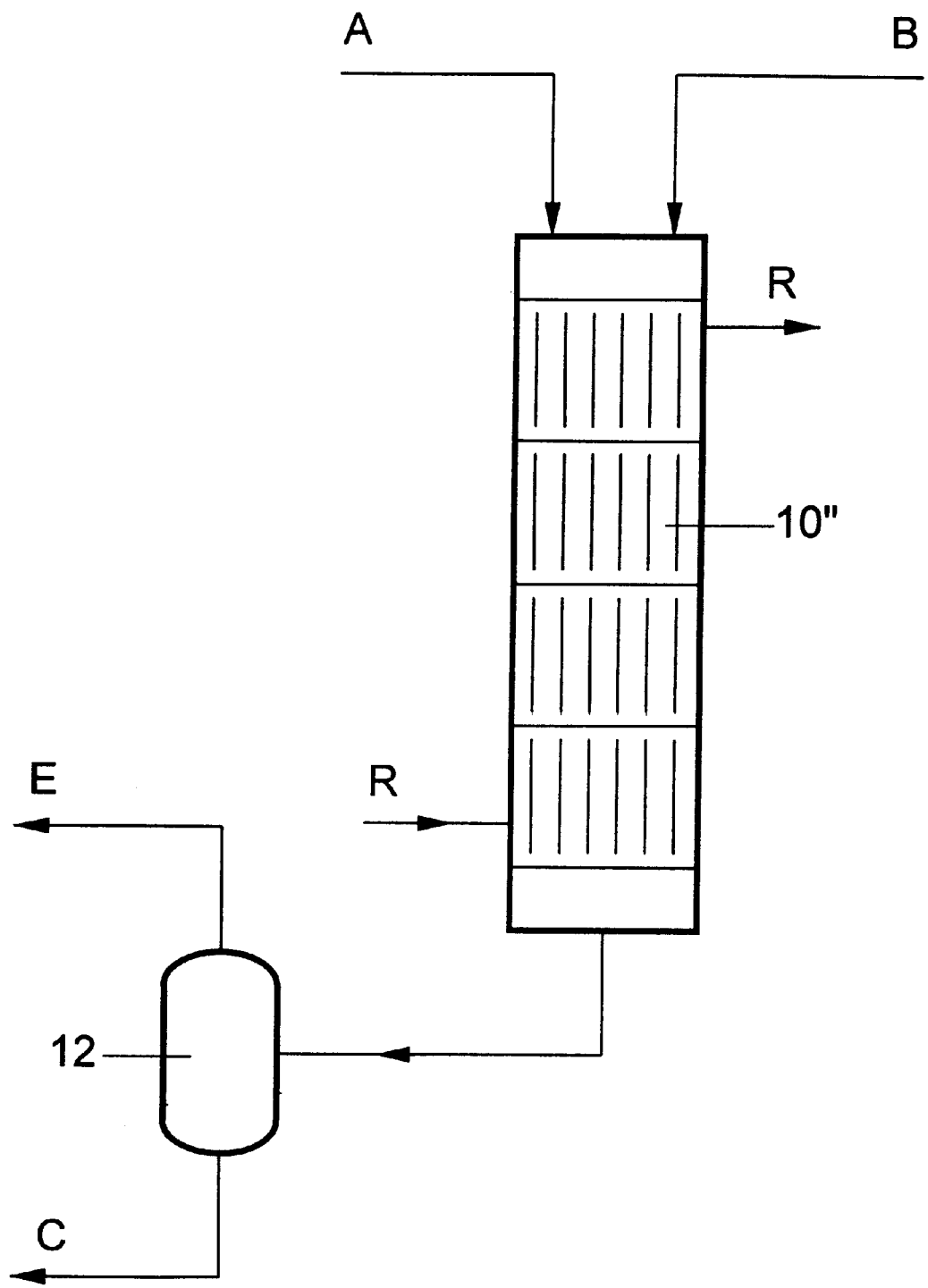

The isothermal alternative form of the preceding case also applies to the invention and is represented in FIG. 6; the same operating recommendations also remain valid.

EXAMPLES

The following examples illustrate the present invention without, however, limiting the scope thereof. In these examples, the following formulae are used:

$LiPF_6$=lithium hexafluorophosphate
LiF=lithium fluoride
$PF_5$=phosphorus pentafluoride
HF=hydrofluoric acid
HCl=hydrochloric acid
$PCl_3$=phosphorus trichloride
$PCl_5$=phosphorus pentachloride.

Example 1

Figure 7:
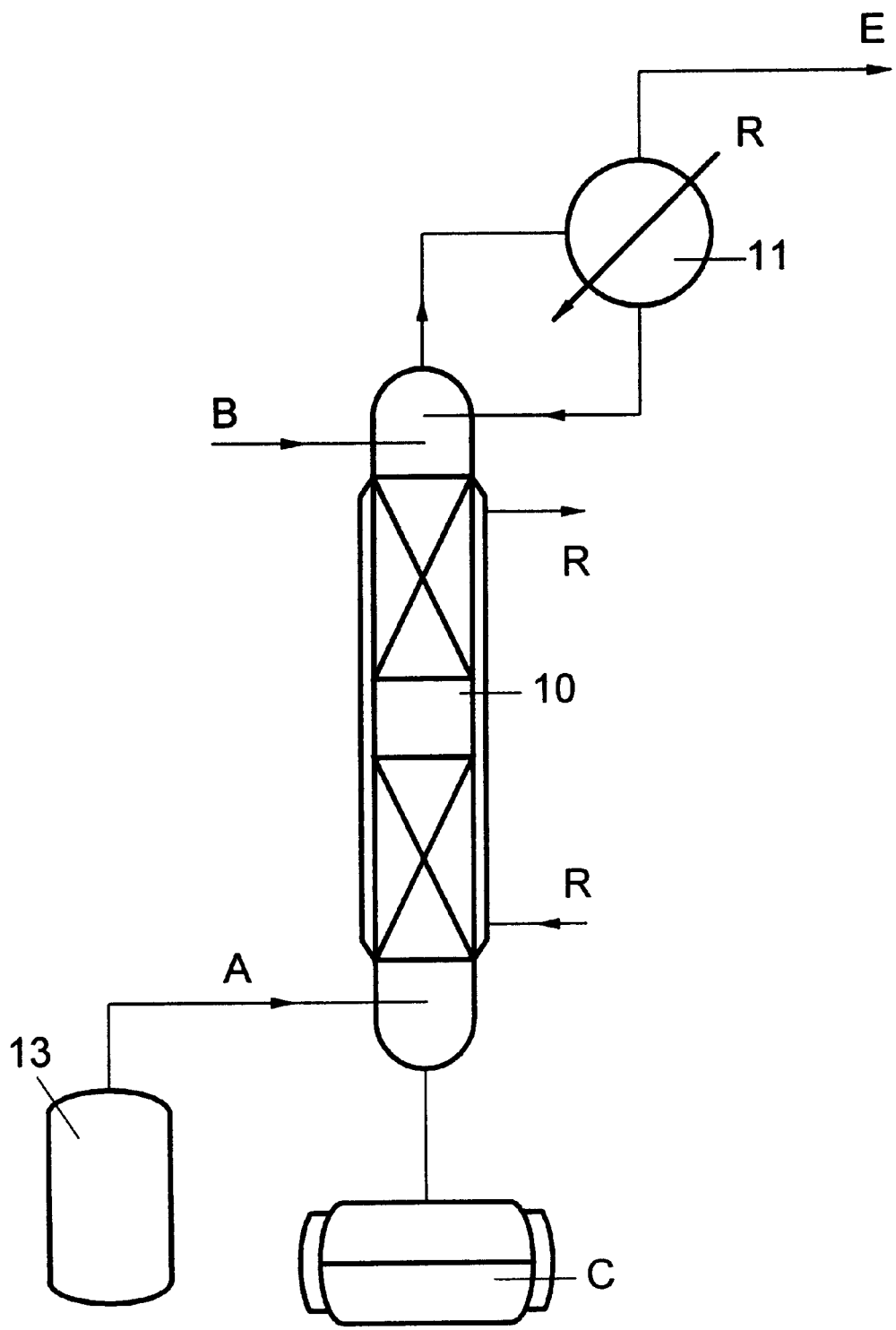

The operation is carried out according to the embodiment shown diagramatically in FIG. 1, in an assembly as shown in FIG. 7.

A packed column 10, in which the number of theoretical stages has been estimated at approximately four, is fed for one hour with the following flows:

At the foot is introduced a gaseous mixture (A) resulting from the reaction for the manufacture of $PF_5$ from $PCl_3$, from chlorine and from HF. This reaction mixture is stored in an autoclave 13 under autogenous pressure at ambient temperature; it has the following composition:
$PF_5$=11.1 molar %
HCl=55.7 molar %
Unconverted HF=25.3 molar %
Unconverted $Cl_2$=7.9 molar %

The total hourly flow rate is 10.770 mol/h, that is to say 484.44 g/h, including 151.2 g/h of $PF_5$ (that is to say 1.2 mol/h).

At the head is fed a solution (B) of LiF in HF which has the following composition:
LiF=1.9 weight %
HF=98.1 weight %

The total flow rate is 123.570 mol/h, that is to say 2482.16 g/h, including 46.6 g/h of LiF (that is to say 1.794 mol/h).

The LiF/$PF_5$ molar ratio is thus in the region of 1.5.

The column 10 is maintained at 0° C., using a jacket through which runs a coolant (R), and it is additionally equipped with a head condenser 11, through which also runs the coolant (R).

Results:

The column 10 functioned in a very stable way, without any blockage or accumulation of solid, throughout the duration of the experiment.

Analysis of the head gas (E) shows a virtual absence of phosphorus: only 0.012 mol/h, i.e. a phosphorus yield of 99%. The head gas (E) only contains HCl carrying HF.

The solution (C) containing $LiPF_6$ and unconverted LiF in HF is collected at the foot.

After removing the HF by evaporation, a solid is collected which is analysed and found to have the following composition by weight:
HF=3.2%
$LiPF_6$=89.3%
LiF=7.5%

This solid can then undergo a specific treatment in order to remove the excess HF.

Example 2

The assembly in FIG. 7 is used. The column 10 is fed, also for one hour, with the following flows:

At the foot, the same crude $PF_5$ (A) as in Example 1 and with the same flow rate. In practice, 484 g/h containing 151 g/h of $PF_5$ are supplied in actual fact.

At the head is supplied a solution (B) of LiF in HF which has the following composition:
LiF=3.9 weight %
HF=96.1 weight %

The total flow rate is divided by two compared with Example 1, which means that in actual fact 1.220 g/h, containing 47.1 g/h of LiF (1.811 mol/h), are supplied.

The LiF/$PF_5$ molar ratio is thus also in the region of 1.5.

The column 10 is also maintained at 0° C., both by its jacket and by its condenser 11.

Results:

Despite the higher concentration of LiF in the liquid feed, no blockage or any accumulation of solid in the column 10 is observed, which column functions without interruption throughout the duration of the experiment.

Analysis of the head gas (E) also reveals the presence of only 0.012 mol/h of phosphorus, which results in a phosphorus yield of 99%.

A solution (C) containing $LiPF_6$ and unconverted LiF in HF is collected at the foot. After removing the HF by evaporation, a solid is collected which is analysed and found to have the following composition by weight:
HF=1.6%
$LiPF_6$=90.9%
LiF=7.4%

This solid can then undergo a specific treatment in order to remove the excess HF.

Example 3

The assembly in FIG. 7 is used. The column 10 is fed, also for one hour, with the following flows:

At the foot, a crude $Pf_5$ having a composition similar to that in the preceding examples, namely:
$PF_5$=11.7 molar %
HCl=58.4 molar %
Unconverted HF=27.7 molar %
Unconverted $Cl_2$=2.2 molar %

The total hourly flow rate is 16.923 mole/h, that is to say 730.4 g/h, including 249.48 g/h of $PF_5$ (that is to say 1.980 mol/h)

At the head is supplied a solution (B) of LiF in HF which has the following composition:
LiF=2 weight %
HF=98 weight %

The total flow rate is 116.46 mol/h, that is to say 2340 g/h, including 46.8 g/h of LiF (that is to say 1.8 mol/h).

The LiF/$PF_5$ molar ratio is in this instance in the region of 0.909, that is to say that there is a 10% molar excess of $PF_5$.

The column 10 is also maintained at 0° C., both by its jacket and by its condenser 11.

Results:

The column 10 functioned in a stable way, without any blockage or accumulation of solid, throughout the duration of the experiment.

Despite operating at a faster gaseous flow rate and with excess $PF_5$, the head gas (E), essentially composed of HCl and HF, only carries away 0.200 mol/h of phosphorus, which results in a phosphorus yield of 89% (10% excess+1% losses).

A solution (C) containing $LiPF_6$ in HF is collected at the foot.

After removing the HF by evaporation, a solid is collected which is analysed and found to have the following composition by weight:

HF=1.8%

LiPF$_6$=98.2%

LiF=traces

This solid can then undergo a specific treatment in order to remove the excess HF.

Example 4 (Comparative)

Figure 8:
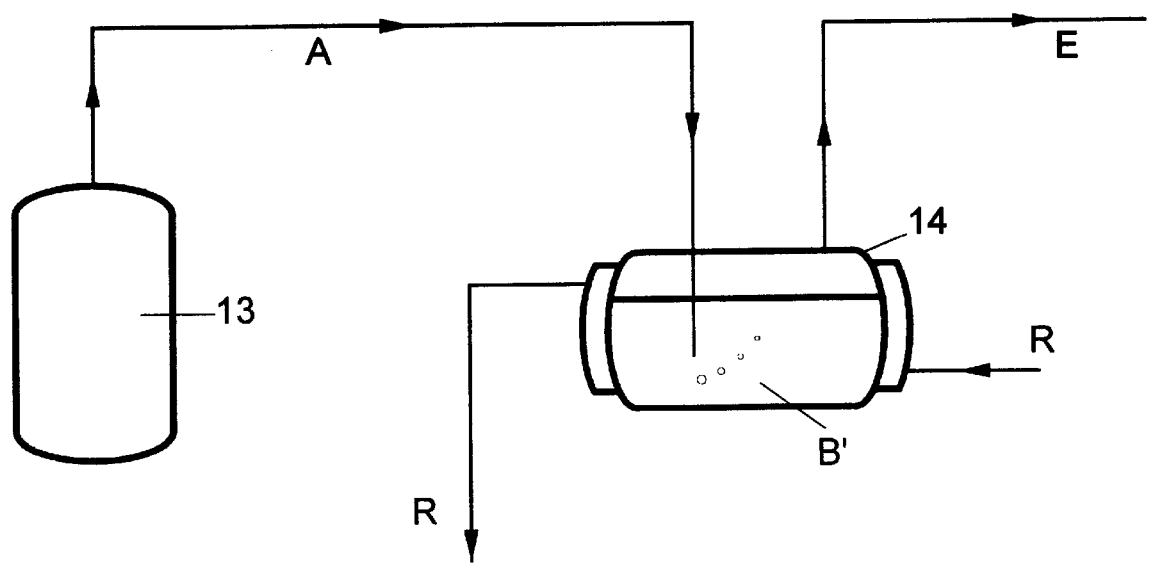

The assembly illustrated in FIG. 8 is used. A solution (B'), composed of 550 mmol of LiF and 19,400 mmol of HF, that is to say assaying 3.55 weight % of LiF, is maintained at approximately 0° C. in a receptacle 14 equipped with a jacket through which runs a coolant (R).

An attempt is made to sparge a crude PF$_5$ (A), resulting from the reaction of PCl$_3$ with chlorine and HF, into this solution; this gaseous mixture, maintained in an autoclave 13 at autogenous pressure at 20° C., has the following composition:

PF$_5$=4.6 molar %

HCl=23.2 molar %

Unconverted HF=70.9 molar %

Unconverted Cl$_2$=1.3 molar %

Over a fairly long period of time (because of the blockages observed), a total flow of 12,956 mmol of this gas is successfully supplied: this amounts to supplying 600 mmol of PF$_5$, which corresponds to a ratio PF$_5$/LiF=1.08.

Results:

A great many blockages of the pipe immersed in the LiF+HF solution are observed: approximately thirty over the period of the test.

On conclusion of the test, unconverted product is observed which corresponds to a phosphorus yield in the region of 93%.

The solid obtained after evaporation of the HF from the solution contained in the receptacle 14 had the following composition by weight:

HF=2%

LiPF$_6$=98%

LiF=traces

The vented material (E) is composed of the following compounds:

Unconverted PF$_5$=0.7 molar %

HCl=46.7 molar %

Unconverted HF=2.6 molar %

Unconverted Cl$_2$=50.0 molar %

This test demonstrates that bringing PF$_5$ and LiF into contact requires precautions both to always maintain, even locally, a content of HF which is sufficient to prevent blockages, on the one hand, and a number of transfer units which is sufficient to achieve a good yield in the conversion of the reactants, on the other hand.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Process for the manufacture of lithium hexafluorophosphate by reaction of phosphorus pentafluoride with lithium fluoride, comprising, on the one hand, (A) gaseous phosphorus pentafluoride or a gaseous mixture comprising phosphorus pentafluoride and hydrochloric acid and, on the other hand, (B) a solution of lithium fluoride in hydrofluoric acid are brought into contact in a column having a sufficient number of transfer units to carry out the reaction of phosphorus pentafluoride with lithium fluoride under predetermined conditions of temperature, of pressure and of molar ratio of the two contrasting reactants and with complete or substantially complete absorption of the phosphorus pentafluoride in the column wherein the content of lithium fluoride in its solution in the feed hydrofluoric acid (B) is selected so that the concentration of hydrofluoric acid is above the solubility threshold of the lithium fluoride and lithium hexafluorophosphate salts, taking into account also evaporation of a fraction of the hydrofluoric acid by energy given off by the reaction.

2. Process according to claim 1, wherein the phosphorus pentafluoride/lithium fluoride supplied molar ratio is between 0.6 and 1.2.

3. Process according to claim 1, wherein the content by weight of lithium fluoride in solution in the feed hydrofluoric acid (B) is between 2 and 6%.

4. Process according to claim 1, wherein the reaction is carried out at a pressure of between atmospheric pressure and 3 MPa.

5. Process according to claim 1, wherein the reaction is carried out at a temperature of between −20 and 70° C.

6. Process according to claim 1, wherein the reaction is carried out under adiabatic conditions, the column then being surmounted by a condenser intended to recondense and to return the portion of the hydrofluoric acid evaporated from the said column as a result of the exothermicity of the reaction between the phosphorus pentafluoride and the lithium fluoride.

7. Process according to claim 1, wherein the reaction is carried out under isothermal conditions, the column being cooled to absorb the heat given off by the reaction.

8. Process according to claim 1, wherein the column is fed countercurrentwise, the gaseous stream, composed of or containing phosphorus pentafluoride, being introduced at the column foot and the solution of lithium fluoride in hydrofluoric acid being introduced at the head, the lithium hexafluorophosphate leaving the column at the foot in solution in hydrofluoric acid.

9. Process according to claim 1, wherein the column is fed cocurrentwise, the gaseous stream, composed of or containing phosphorus pentafluoride, and the solution of lithium fluoride in hydrofluoric acid, being introduced at the base of the column, which then functions as a plug flow reactor, the resulting liquid solution of lithium hexafluorophosphate in hydrofluoric acid being separated at the head of the column.

10. Process according to claim 1, wherein the column is fed cocurrentwise, the gaseous stream, composed of or containing phosphorus pentafluoride, and the solution of lithium fluoride in hydrofluoric acid being introduced at the column head, the resulting liquid solution of lithium hexafluorophosphate in hydrofluoric acid being separated in a separating vessel mounted on the withdrawal line at the base of the said column.

11. Process according to claim 1, wherein the starting material is a gaseous mixture obtained as crude product in the manufacture of phosphorus pentafluoride from phosphorus trichloride or from phosphorus pentachloride and consequently containing hydrochloric acid, chlorine and hydrofluoric acid, the hydrochloric acid then escaping in the vented material, completely or substantially completely free of phosphorus pentafluoride.

12. Process according to claim 1 wherein the resulting solution of lithium hexafluorophosphate in hydrofluoric acid is evaporated to crystallize the lithium hexafluorophosphate, and the suspension of crystals thus obtained is then treated to completely purify the finished product.

13. Process according to claim 1, wherein the column is an empty, packed or plate absorption column.

14. Process according to claim 1, wherein the process is carried out continuously.

15. Process according to claim 2, wherein the molar ratio is between 1.05 and 1.15.

16. Process according to claim 3, wherein the content by weight is between 3 and 5%.

17. Process according to claim 4, wherein the pressure is between atmospheric and 2 MPa.

18. Process according to claim 5, wherein the temperature is between −10 and 40° C.

* * * * *